US012610180B2

(12) United States Patent
Leahy et al.

(10) Patent No.: US 12,610,180 B2
(45) Date of Patent: Apr. 21, 2026

(54) MEMS MICROPHONE WITH MULTIPLE SOUND PORTS

(71) Applicant: Soundskrit Inc., Montreal (CA)

(72) Inventors: Stephane Leahy, Montreal (CA); Wan-Thai Hsu, Saline, MI (US); Sahil Gupta, Montreal (CA)

(73) Assignee: Soundskrit Inc., Montreal (CA)

( * ) Notice: Subject to any disclaimer, the term of this patent is extended or adjusted under 35 U.S.C. 154(b) by 369 days.

(21) Appl. No.: 18/106,294

(22) Filed: Feb. 6, 2023

(65) Prior Publication Data

US 2023/0254635 A1 Aug. 10, 2023

Related U.S. Application Data

(60) Provisional application No. 63/306,974, filed on Feb. 4, 2022.

(51) Int. Cl.
*H04R 1/28* (2006.01)
*H04R 1/04* (2006.01)
(Continued)

(52) U.S. Cl.
CPC ............ *H04R 1/2846* (2013.01); *H04R 1/04* (2013.01); *H04R 3/00* (2013.01); *H04R 19/005* (2013.01);
(Continued)

(58) Field of Classification Search
CPC .......... H04R 1/2846; H04R 1/04; H04R 3/00; H04R 19/005; H04R 19/04; H04R 2201/003
See application file for complete search history.

(56) References Cited

U.S. PATENT DOCUMENTS 9,938,133 B2 4/2018 Kautzsch et al.
10,141,007 B1 * 11/2018 Kim ........................ G10L 25/18
(Continued)

FOREIGN PATENT DOCUMENTS

JP H06237143 A 8/1994
JP 2000312126 A 11/2000
(Continued)

OTHER PUBLICATIONS

Miles et al., "A flow-sensing velocity microphone", 4 pages, 2019.
(Continued)

*Primary Examiner* — Carolyn R Edwards
*Assistant Examiner* — Kuassi A Ganmavo
(74) *Attorney, Agent, or Firm* — Lempia Summerfield Katz LLC

(57) ABSTRACT

An acoustic sensor device comprises a package and a substrate disposed in the package. The acoustic sensor device also comprises a microelectromechanical system (MEMS) transducer formed in the substrate, the MEMS transducer i) comprising a cantilever structure and ii) having a first acoustic impedance and at least two sound ports positioned on the package on opposing sides of the MEMS transducer. The at least two sound ports coupling the MEMS transducer to an ambient environment via respective acoustic channels formed in the package, wherein the at least two sound ports are positioned on the package in a manner that ensures that the respective acoustic channels have a combined second acoustic impendence that is less the first acoustic impedance of the MEMS transducer.

20 Claims, 10 Drawing Sheets

(51) Int. Cl.
*H04R 3/00* (2006.01)
*H04R 19/00* (2006.01)
*H04R 19/04* (2006.01)

(52) U.S. Cl.
CPC ....... *H04R 19/04* (2013.01); *H04R 2201/003* (2013.01)

(56) References Cited

U.S. PATENT DOCUMENTS 11,462,232 B1 * 10/2022 Wang .................... H04R 29/008
2005/0024165 A1 2/2005 Hsu
2009/0059724 A1 * 3/2009 Scanlon .................. G01S 3/801 367/118
2010/0119088 A1 * 5/2010 Sheplak ................... H05K 3/46 29/886
2012/0328142 A1 * 12/2012 Horibe ................... H04R 3/005 381/355
2013/0140655 A1 6/2013 Yeh et al.
2015/0289045 A1 * 10/2015 Khenkin .............. H04R 19/005 381/150
2015/0304777 A1 10/2015 Xu et al.
2016/0167946 A1 * 6/2016 Jenkins ................ H04R 19/005 257/416
2017/0111731 A1 * 4/2017 Merks-Swolfs ..... H04R 1/2838
2017/0150248 A1 * 5/2017 Littrell .................... H04R 1/222
2018/0041828 A1 * 2/2018 Sibbald ............ G10K 11/17873
2018/0041843 A1 * 2/2018 Sibbald .................. H04R 5/033
2018/0091910 A1 * 3/2018 Porter .................. H04R 29/001
2019/0055119 A1 * 2/2019 Sooriakumar ....... H04R 1/2876
2020/0095117 A1 * 3/2020 Kim ..................... H04R 19/005
2022/0103917 A1 * 3/2022 Hong ..................... H04R 1/406
2022/0396470 A1 12/2022 Leahy et al.

FOREIGN PATENT DOCUMENTS

WO WO-2011093584 A2 * 8/2011 ........... H04R 1/2807
WO 2019226958 A1 11/2019
WO 2022266090 A1 12/2022

OTHER PUBLICATIONS

R.N. Miles et al., "Sound-Induced Motion of a Nanoscale Fiber", Journal of Vibrations and Acoustics, 7 pages, 2017.
R.N. Miles, "A compliant capacitive sensor for acoustics: Avoiding electrostatic forces at high bias voltages", IEEE Sensors Journal, 8 pages, 2018.
Zhou et al., "Sensing fluctuating airflow with spider silk", PNAS, vol. 114, No. 46, pp. 12120-12125, Nov. 14, 2017.

* cited by examiner

MEMS MICROPHONE WITH MULTIPLE SOUND PORTS

CROSS-REFERENCES TO RELATED APPLICATIONS

This application claims the benefit of U.S. provisional application entitled "MEMS Microphone with Multiple Sound Ports," filed Feb. 4, 2022, and assigned Ser. No. 63/306,974, the entire disclosure of which is hereby expressly incorporated by reference.

BACKGROUND OF THE DISCLOSURE

Field of the Disclosure

The disclosure relates generally to microelectromechanical system (MEMS) microphones.

Brief Description of Related Technology

Traditional omnidirectional acoustic sensors (e.g., microphones) measure the pressure of incoming sound. A transducer, or membrane, that moves in response to the incoming sound is encapsulated in a package. The transducer partitions the package into two air volumes, a front volume and back volume. The microphone package has a sound port that couples one of the volumes of air to the outside ambient environment (e.g., ambient air). As sound hits the microphone, the sound couples into one of the air volumes through the sound port and changes the pressure. This creates a difference in pressure between the front volume and back volume that creates a force on the transducer and drives its motion. In this configuration, the omnidirectional microphone responds equally to sound travelling at all directions.

Directional acoustic sensors, on the other hand, use two sound ports, exposing each opposing side of the transducer to the ambient environment. They are designed to have high sensitivity to sound travelling in one direction and low sensitivity to sound travelling in another direction. Directionality allows the microphone to separate sound sources.

Traditional directional microphones respond to the difference in pressure between the two sound ports as sound waves travel in the ambient environment. A transducer, or membrane, is disposed in a package such that the transducer or membrane partitions the package into two air volumes, a front volume and a back volume. A first sound port formed in the package couples the front volume of air to the outside ambient environment at a first location. A second sound port formed in the package couples the back volume of air to the outside ambient environment at a second location spaced at some distance from the first location. As a sound wave travels past the microphone, the sound wave creates a first local pressure at the location of the first sound port and a second local pressure at the location of the second sound port. The difference in the first pressure and second pressure exerts a force on the membrane and cause the membrane to vibrate. The vibrations of the membrane are then converted to an electrical signal through one of a variety of transduction mechanism such as capacitive, piezoelectric, optical, or piezoresistive readout.

In such traditional directional microphones, the transducer or membrane is typically configured as a fixed-fixed structure that is fixed on both ends of the membrane. Because the membrane is fixed on both ends, the membrane has a relatively high acoustic impedance and a relatively high resonant frequency. For example, such traditional directional microphones have resonant frequencies close to or above 20 kHz. As a result, the traditional directional microphones may not be able to sense relatively low differences in pressure created by a sound wave.

SUMMARY OF THE DISCLOSURE

In accordance with one aspect of the disclosure, an acoustic sensor device comprises a package and a substrate disposed in the package. The acoustic sensor device also comprises a microelectromechanical system (MEMS) transducer formed in the substrate, the MEMS transducer i) comprising a cantilever structure and ii) having a first acoustic impedance and at least two sound ports positioned on the package on opposing sides of the MEMS transducer. The at least two sound ports coupling the MEMS transducer to an ambient environment via respective acoustic channels formed in the package, wherein the at least two sound ports are positioned on the package in a manner that ensures that the respective acoustic channels have a combined second acoustic impendence that is less the first acoustic impedance of the MEMS transducer.

In accordance with another aspect of the disclosure, an acoustic sensor device comprises a package, including at least a substrate and a lid over the substrate, and a microelectromechanical system (MEMS) transducer formed in the substrate, the MEMS transducer comprising a cantilever structure. The acoustic sensor device also includes a first sound port on the lid above the MEMS transducer, the first sound port coupling the MEMS transducer to an ambient environment via a first acoustic channel formed in the package and a second sound port on the substrate below the MEMS transducer, the second sound port coupling the MEMS transducer to the ambient environment via a second acoustic channel formed in the package. Positions of the first sound port on the lid and the second sound port on the substrate are such that the first sound port and the second sound port are aligned with the MEMS transducer.

In connection with any one of the aforementioned aspects, the acoustic sensor devices described herein may alternatively or additionally include or involve any combination of one or more of the following aspects or features. The at least two sound ports include a first sound port positioned above the MEMS transducer, the first sound port coupling the MEMS transducer to the ambient environment via a first acoustic channel formed in the package, and a second sound port positioned below the MEMS transducer, the second sound port coupling the MEMS transducer to the ambient environment via a second acoustic channel formed in the package. The first sound port and the second sound port are positioned on the package such that the first sound port. The second sound port are aligned with the MEMS transducer to ensure that the first acoustic channel and the second acoustic channel have the combined second acoustic impendence that is less the first acoustic impedance of the MEMS transducer. At least one of the first sound port and the second sound port is positioned on the package such that at least of the first acoustic channel and the second acoustic channel is straight. At least one of the first sound port and the second sound port is positioned on the package such that at least of the first acoustic channel and the second acoustic channel is free of bends. Each of one or both of the first sound port and the second sound port comprises an opening having an area that is at least as large as an area of the transducer. The package includes i) a printed circuit board (PCB) that comprises the substrate and i) a lid over the substrate. The first sound port comprises a first hole in the lid on a first side the MEMS transducer. The second sound port comprises a second hole in the PCB on a second side of the MEMS transducer opposite of the first side of the MEMS transducer. The PCB has a width, a length, and a thickness, the lid has a height, and the width and the length of the PCB are designed such that an outside acoustic path between the first sound port and the second sound port is at least substantially equal to a combination of the thickness of the PCB and the height of the lid. The PCB has a width, a length, and a thickness, the lid has a height, and the width and the length of the PCB are designed such that an outside acoustic path between the first sound port and the second sound port is greater than a combination of the thickness of the PCB and the height of the lid. A height of the lid is designed to substantially minimize a volume formed between the lid and the PCB such that a resonant frequency of the package is above an audible frequency range. The MEMS transducer comprises one or more porous plates. The MEMS transducer comprises an array of beams having air gaps between respective beams of the array of beams. The substrate includes a cavity, and the MEMS transducer is suspended over the cavity. The MEMS transducer and/or the cavity are configured to block frequencies of sound below and/or above an audible sound range. The first sound port is positioned on the lid such that the first acoustic channel is straight. The first sound port is positioned on the lid such that the first acoustic channel is free of bends . . .

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 9:
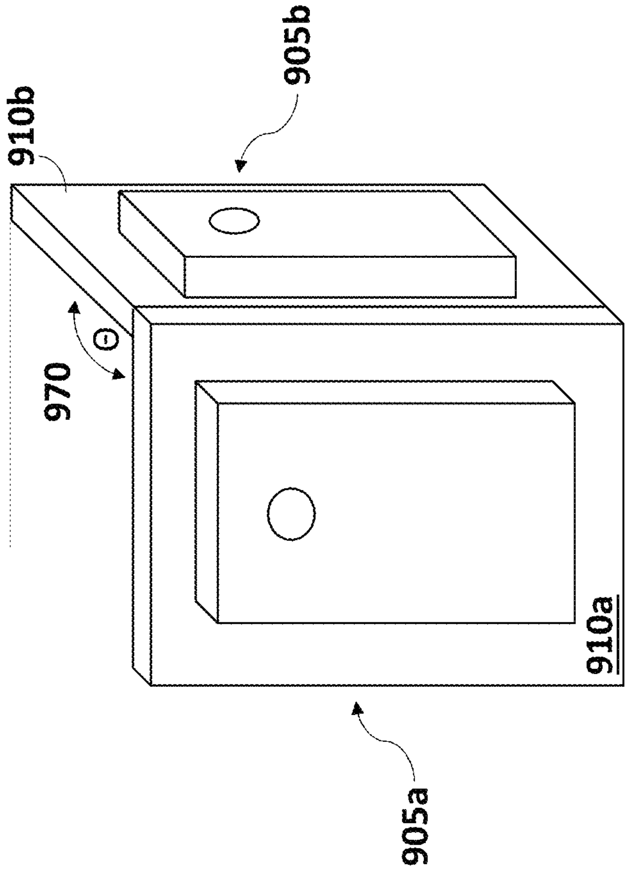

In FIG. 9 is a schematic diagram depicting two acoustic sensor devices having opposing sound ports and configured to capture sound from two different directions in accordance with an example.

Figure 10:
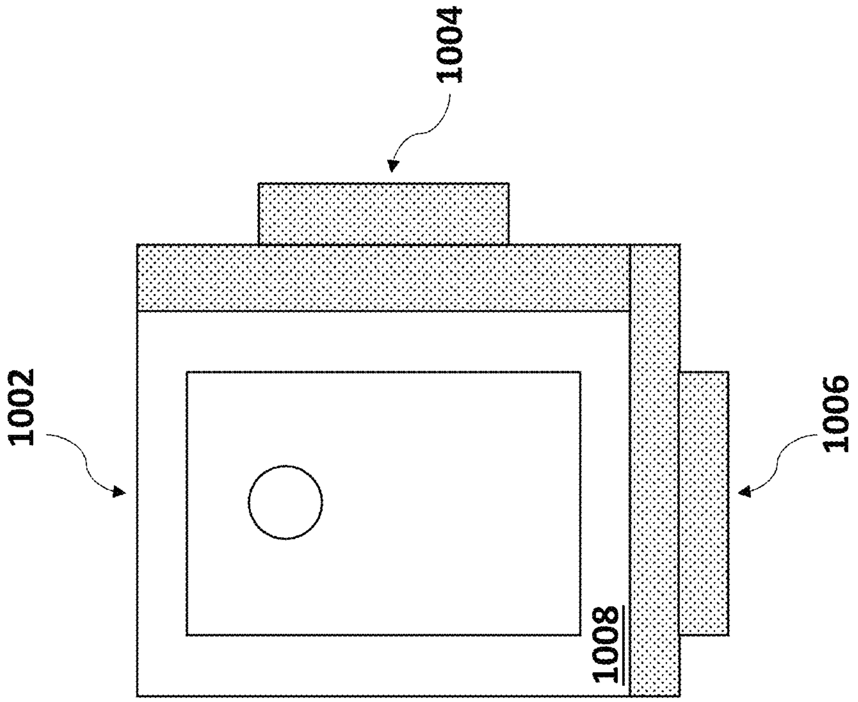

In FIG. 10 is a schematic diagram depicting three acoustic sensor devices having opposing sound ports and configured to provide 360-degree sensing in accordance with an example.

The embodiments of the disclosed devices may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Acoustic sensor devices, such as microphones, that are equipped with cantilever or fixed-free transducer structures and multiple sound ports are described. In an example, an acoustic sensor device includes a package and a substrate disposed in the package. A transducer is formed in the substrate. In an aspect, the transducer is a microelectromechanical system (MEMS) transducer. The transducer has fixed-free or cantilever structure in which one end of the transducer is fixed while the other end of the transducer is allowed to move freely. The acoustic sensor device also includes at least two sound ports that couple the transducer to an ambient environment (e.g., ambient air) via respective acoustic channels formed in the package. The at least two sound ports may include a first sound port and a second sound port that are positioned on the package on opposing sides of the transducer. The transducer may sense a difference in pressure between the two sound ports as a sound wave moves past the acoustic sensor device.

In various aspects, due to the cantilever structure of the transducer of the acoustic sensor device, an acoustic impedance of the transducer may generally be lower than an acoustic impedance of a similarly sized transducer that is configured as a fixed-fixed transducer that is fixed on both ends of the transducer. The relatively low acoustic impendence of the cantilever transducer results in relatively low resonance frequency of the cantilever transducer. For example, the cantilever transducer of the acoustic sensor device may have a resonance between 1 kHz and 5 kHz as compared to 20 kHz or above resonance of a fixed-fixed transducer used in a typical directional microphone. The lower acoustic impedance and lower resonant frequency of the transducer allows the transducer to sense a relatively low difference in pressure between the two sound ports, thus improving sensitivity and signal to noise ratio of the acoustic sensor device as compared to sensitivity and signal to noise ratio that may be obtainable in an acoustic sensor device having a similarly sized transducer with a fixed-fixed structure. However, because of the cantilever structure and the resulting low impedance of the transducer of the acoustic sensor device, the acoustic sensor device is more sensitive to degradation in sensitivity due to additional acoustic impedance that may be introduced by acoustic channels that couple the transducer to the acoustic environment.

In an example, the at least two sound ports of the acoustic sensor device are positioned on the package in a manner that ensures that the respective acoustic channels have a combined second acoustic impendence that is less than the acoustic impedance of the transducer. For example, the at least two ports of the acoustic sensor device are positioned on the package such that acoustic channels formed in the package are relatively short and straight. Such positioning of the at least two sound ports ensures that the relatively low acoustic impedance of the cantilever transducer is not significantly affected or counteracted by the acoustic impedance of the acoustic channels formed in the package. Thus, with such positioning of the at least two sound ports, acoustic impedance of the transducer and, accordingly, sensitivity of the acoustic sensor device, may be at least substantially unaffected by the package.

In an example, the at least two sound ports of the acoustic sensor device include a first sound port positioned above the transducer, the first sound port coupling the transducer to the ambient environment via a first acoustic channel formed in the package and a second sound port positioned below the transducer, the second sound port coupling the transducer to the ambient environment via a second acoustic channel formed in the package. In an example, the first sound port and the second sound port are positioned on the package such that the first sound port and the second sound port are aligned with the transducer in the package. Because the two sound ports are aligned with the transducer, the acoustic resistance of the acoustic channels formed in the package to couple the transducer to the acoustic environment is less than the acoustic resistance of the transducer. Thus, in an aspect, the package does not significantly affect the relatively low acoustic impedance of the transducer. As a result, the package does not significantly affect sensitivity of the acoustic sensor device.

In an aspect, the at least two sound ports of the acoustic sensor device are also made sufficiently large to minimize the effect of the package on the relatively low acoustic impedance of the cantilever transducer. For example, an area of the opening of each of one or both of the first sound port and the second sound port is at least as large as an area of the transducer. In various examples, as a result of the particular positioning of the sound ports on the package and, in at least some examples, of the sufficiently large size of the sound ports positioned on the package, the package of the acoustic sensor device does not significantly affect the relatively low acoustic impedance of the cantilever transducer and, thus, does not significantly affect the relatively low sensitivity of the acoustic sensor device.

In an example, because the area of the opening of each of one or both of the first port and the second port is at least as large as the area of the transducer, the acoustic impedance of the transducer is not significantly affected by the additional acoustic impendence causes by the sound ports and acoustic channels that couple the transducer to the acoustic environment.

As described above, in one aspect, the transducer of the disclosed acoustic sensor device (e.g., a microphone) includes a transducer (e.g., a MEMS transducer) having a cantilever or fixed-free structure. By using a cantilever (as opposed to a fixed-fixed structure) transducer, the acoustic impedance of the transducer may be lowered and mechanical sensitivity and compliance of the transducer may be improved. That improvement allows the die size to be smaller, which, in turn, allows other size reductions, including, for instance, the overall package size and the sound ports.

One or more features of the package and/or other components of the acoustic sensor device may be configured or directed to supporting the directionality of the acoustic sensor device. For example, the features may ensure that the directionality is unaffected by resonance modes of the package.

The disclosed transducers and acoustic sensor devices may be useful in a wide variety of microphone applications and contexts, including, for instance, various consumer devices such as smartphones, laptops, and earbuds that includes or are otherwise equipped with microphones. The configuration of the disclosed transducers and acoustic sensor devices may be useful in connection with any device in which there is an interest in listening to sound originating from a specific direction with greater sensitivity than sound originating from other directions.

Although generally described in connection with microphones, the disclosed transducers and acoustic sensor devices may be used in other applications and contexts. For instance, the disclosed transducers and acoustic sensor devices are useful in connection with accelerometers, gyroscopes, inertial sensors, pressure sensors, gas sensors, etc. In these examples, as the sensor experiences a vibratory event (e.g., an acceleration), the transducer vibrates, and the signal captured by the sensor then serves as an approximation of the motion seen by the sensor. The disclosed transducers and acoustic sensor devices are described in the context of excitation by sound waves. However, alternative or additional stimuli may excite the disclosed transducers in other contexts.

Figure 1:
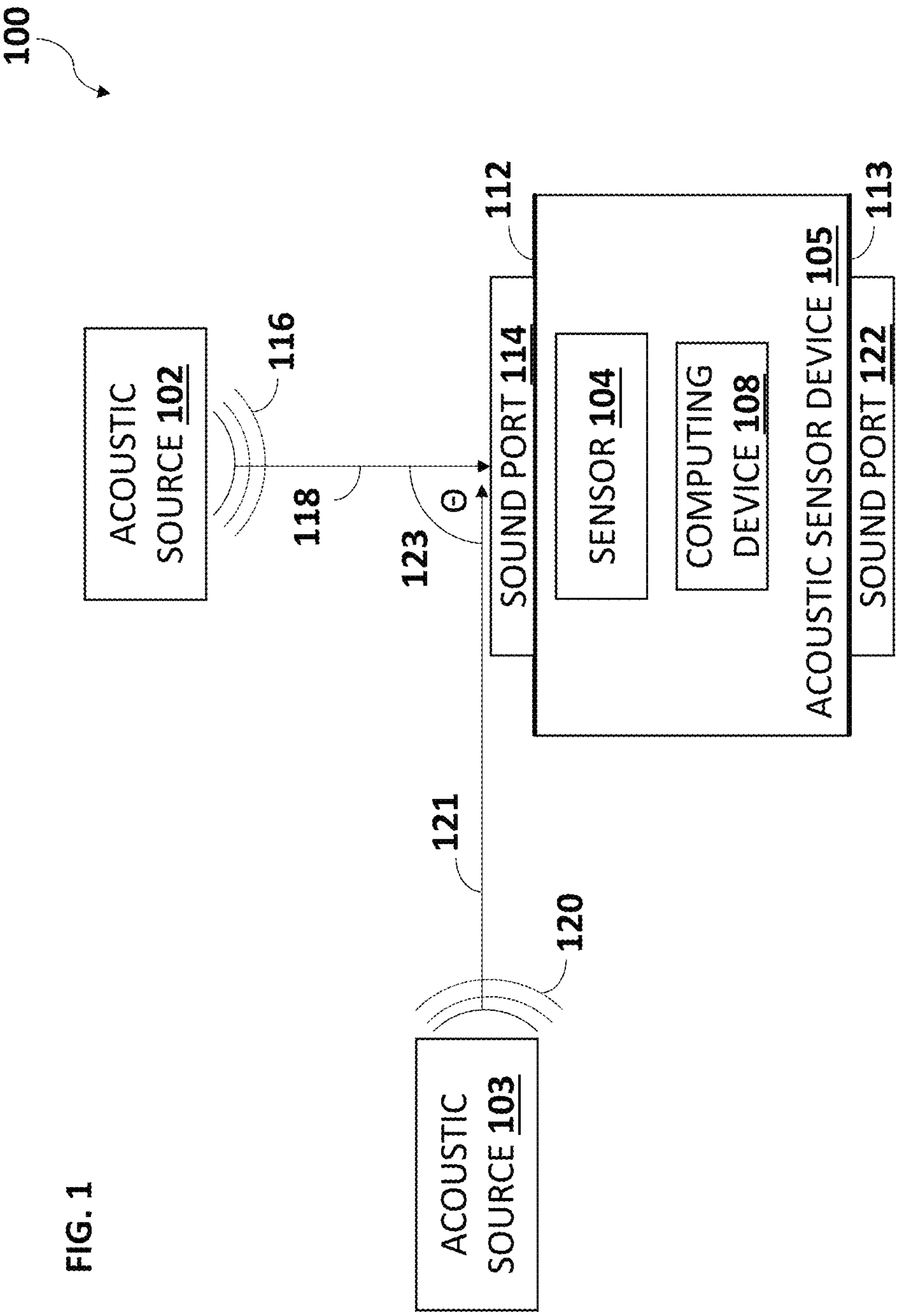
FIG. 1 is a block diagram depicting an example acoustic sensing environment that includes an acoustic sensing device having opposing sound ports in accordance with an example.

Turning now to FIG. 1 is a block diagram of an acoustic sensing environment 100, in accordance with an example. Acoustic sensing environment 100 includes acoustic waves 116 and 120 emitted by a first acoustic source 102 and second acoustic source 103 respectively and are received or captured by the acoustic sensor device 105. Acoustic waves 116 are propagated radially and include direct path 118. Acoustic waves 120 are propagated radially and include direct path 121 at an angle 123 from direct path 116. Acoustic sensor device 105 may be an electronic device such as a smartphone, personal computer, headset, TV, robot, etc. Embedded inside the acoustic sensor device 105 is an acoustic sensor 104 and computing device 108 (e.g., an application specific circuit (ASIC)). The acoustic sensor (e.g., a transducer of a microphone) 104 is configured to capture or sense acoustic waves and computing device 108 is configured to process and analyze the sensed acoustic waves. The acoustic sensor device 105 has a first surface 112 on which a first sound port 114 lays and couples the acoustic sensor 104 to the acoustic environment 100. The acoustic sensor device 105 further has a second surface 113 on which a second sound port 122 lays and couples the acoustic sensor 104 to the acoustic environment 100. The sound ports 114 and 122 are said to be opposing sound ports because they lay on opposing surfaces 112 and 113 respectively of the acoustic sensor device 105. In some instances, sound ports 114 and/or 122 may include multiple holes. Acoustic waves 120 travel along the path 121 that is parallel to the surfaces 112 and 113, while acoustic waves 116 travel along the path 118 that is perpendicular to the surfaces 112 and 113. The following disclosure describes a packaging configuration in which the acoustic sensor 104 captures the portion of the acoustic environment 100 with acoustic waves 120 parallel to edge 112 with decreased sensitivity relative to the portion of the acoustic environment 100 with acoustic waves 116. For example, the acoustic sensor 104 may capture acoustic waves 116 with at least 20 dB greater sensitivity than acoustic waves 120. In this sense, the acoustic sensor 104 is said to be directional. In some instances, the acoustic waves 116 and 120 may emanate from a combination of different acoustic sources in environment 100.

Figure 2B:
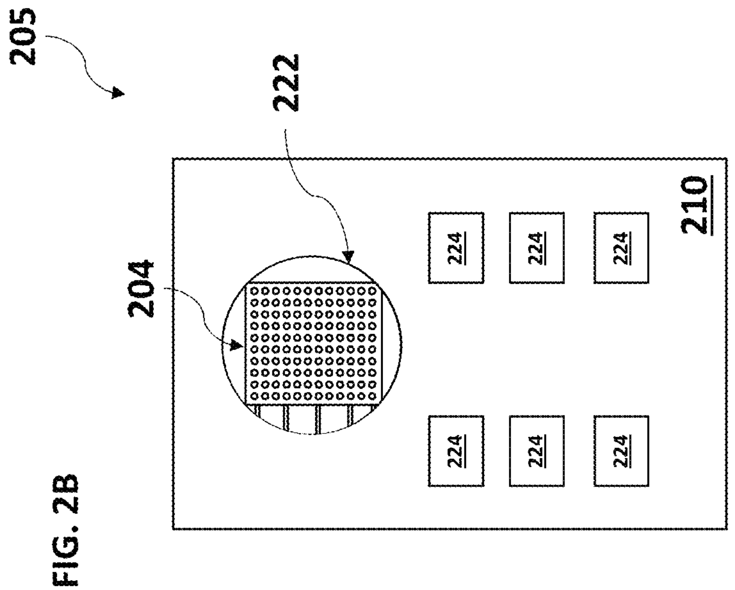
FIG. 2B is a bottom view schematic of the acoustic sensor device of FIG. 2A in accordance with an example.
Figure 2A:
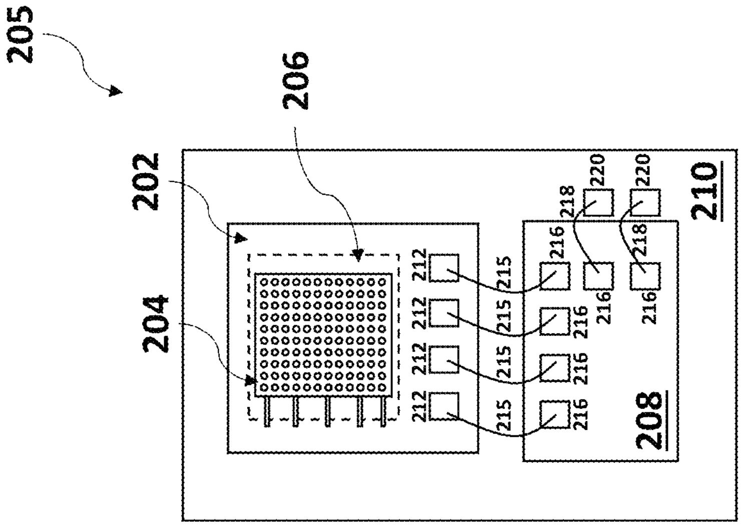
FIG. 2A is a top view schematic of an acoustic sensor device that includes a MEMS transducer mounted on a printed circuit board in accordance with an example.

FIG. 2A is a top view schematic of an acoustic sensor device 205 that includes a transducer 204 and a printed circuit board (PCB) or other substrate 210 (referred to herein as "PCB 210"), in accordance with an example. The acoustic sensor device 205 may be a microphone, for example. The transducer 204 comprises a substrate (e.g., a silicon MEMS die) 202 that may be mounted on or otherwise supported by the PCB 210 using an adhesive layer or any other method known by those skilled in the art. The transducer 204 may be a MEMS transducer that is patterned and etched in a substrate 202 and suspended over a cavity 206 in the substrate 202. The cavity 206 in the substrate 202 may be formed via deep reactive ion etching. The transducer 204 is configured such that it vibrates when exposed to an external stimulus. In an example, the transducer 204 is coupled to an ambient environment via acoustic channels and sound ports (not shown in FIG. 2A) that may be formed in the acoustic sensor device 205 on opposing sides of the transducer 204 as described in more detail below. The transducer 204 may be configured such that the transducer 204 vibrates in response to a changing difference in pressure created on the opposing sides of the transducer 204 as the sound waves travel past the in the ambient environment past the sound ports. The pressure difference may be created across the sound ports due to the phase and/or amplitude difference of the sound wave seen at the sound ports.

The transducer 204 may be constructed or configured such that a moving electrode thereof is relatively thin. For example, the moving electrode may be less than 2 um or 1 um in thickness. In an example, the transducer may comprise a cantilever of fixed-free structure in which the moving electrode is fixed at one end and is allowed to move freely at the other end. The cantilever structure of the transducer 204 generally results in a lower acoustic impedance of the transducer 204 as compared to a similarly sized transducer that comprises a fixed-fixed structure in which the movable electrode is fixed at both ends. The transducer 204 is sensitive to lower differences in pressure as compared to a similarly sized transducer that comprises a fixed-fixed structure, and resonates at a lower resonant frequency as compared to a similarly sized transducer a fixed-fixed structure in which the movable electrode is fixed at both ends. For example, the transducer 204 has a resonant frequency between 1 kHz an 5 kHz.

In some aspects, the transducer 204 and/or the cavity 206 may be designed to block certain frequencies, such that the transducer 204 responds to only specific frequencies. For example, the transducer 204 and/or the cavity 206 may be designed to block certain frequencies outside of the audible range (e.g., soundwaves from 20 Hz-20 kHz) such that the transducer 204 responds to only frequencies in the audible range. For example, the transducer 204 and/or the cavity 206 may block frequencies below 100 Hz to reduce the microphone's sensitivity to changes in pressure difference between the opposing sound ports due to wind.

In another example, the transducer 204 may be configured to allow air to flow through the transducer 204 and may be configured to vibrate as air flows through the transducer 204. As air flows through the transducer 204, the air exerts a viscous force on the transducer 204, causing the transducer 204 to vibrate. In some examples, the viscous force from air flow may be the dominant driving force for the motion of the transducer when exposed to an external stimulus such as the passage of a sound wave. The transducer 204 may be or include any structure that allows the passage of air flow through it. For example, the transducer 204 may be one or multiple porous plates with holes that allow for the passage of air. In other examples, the transducer 204 may include an array of beams with air gaps between them. In some cases, the transducer 204 may not let air flow pass through it, but may be sufficiently thin such that it still moves with the air flow and can effectively be considered to be driven by the air flow. In these instances, the transducer 204 may be non-porous. In some cases, movement of the transducer 204 is driven (e.g., partially driven) by forces due to the flow of the viscous medium past the transducer 204. For instance, the transducer 204 may respond to acoustic excitation or air flow (e.g., a microphone). The transducer 204 may be oriented such that sound propagating through air flows through its moving (or moveable) element. As the air flows across the moving element of the transducer 204, the air flow induces a viscous drag force (e.g., friction) that excites the element and, in some cases, dominates the motion of the element. This type of behavior may be obtainable using small microstructures constructed through MEMS fabrication techniques. Because the moving element will move in the same direction as the air flow, or drag force, the transducer, or sensor, is inherently directional. Air that flows in other directions (i.e., that is not through the moving element) will not excite a response, or at least the response will be substantially attenuated.

In some examples, the transducer 204 may not respond entirely to air flow, but is only connected to one edge of the cavity and so it does not create a perfect seal at the cavity as a traditional omnidirectional microphone membrane does. The transducer 204 may be further configured as a capacitive sensor that transduces its mechanical motion into an electrical signal. Alternatively or additionally, the transducer 204 may utilize piezoelectrical, piezoresistive, electromagnetic, and/or optical transduction methods. The cavity 206 is also constructed or configured such that it does not significantly restrict the passage of air flow through it. For example, the cavity 206 may have a length and width of at least approximately 500 um. The transducer 204 may be connected to one or more bond pads 212 on the substrate 202 through one or more conductive layers present in the MEMS die.

An ASIC 208 is also mounted on or otherwise supported by the PCB 210 through an adhesive layer or any other method known to those skilled in the art. The ASIC includes one or more bond pads 216 and is electrically connected to the transducer 204 through wire bonds 215. The PCB 210 may also include one or more bond pads 220. The ASIC 208 may be connected to the bond pads 220 through wire bonds 218. The ASIC 208 receives an electrical signal generated by the transducer 204 and amplifies the signal. In some examples, the ASIC 208 may provide one or bias voltages to the transducer 204. Power may be provided to the ASIC 208 externally through one or more bond pads 220, and the output of the ASIC 208 may be transmitted to an external processor through one or more of the pond pads 220.

FIG. 2B depicts a bottom view of the acoustic sensor device 205, according to an example. The PCB 210 includes a hole, or sound port, 222 over which the transducer 204 and cavity 206 are suspended. The sound port 222 is constructed or configured such that it allows the passage of sound waves through it. On the bottom of the PCB 210 are one or more electrical pads 224. In some examples the pads 224 may be soldered on to an external PCB not drawn and connect the transducer 204 and ASIC 208 to external electrical components. The sound port 222 may have a circular, conical, elliptical, rectangular, hexagonal, or any other geometric profile.

Figure 3B:
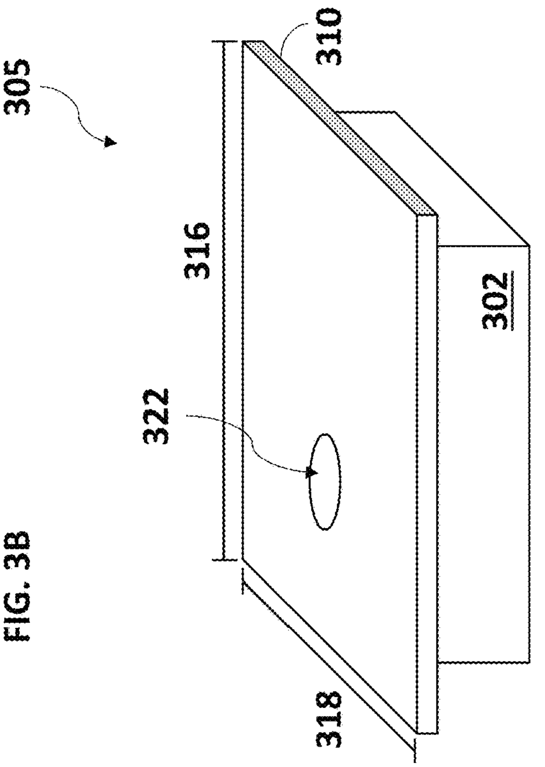
FIG. 3B depicts a bottom-angled view of the acoustic sensing device of FIG. 3A in accordance with an example.
Figure 3A:
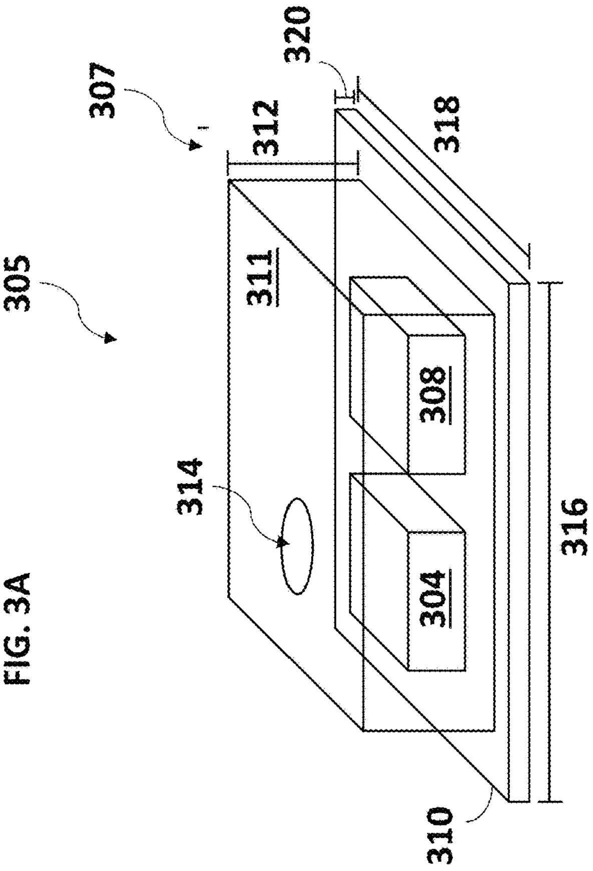
FIG. 3A depicts a top-angled view of an acoustic sensor device having opposing sound ports in accordance with an example.

FIG. 3A depicts a top-angled view of an acoustic sensor device 305, according to an example. The acoustic sensor device 305 may be a microphone, for example. The acoustic sensor device 305 may include a transducer 304. The transducer 304 may be a MEMS transducer. The transducer 304 may comprise a cantilever structure as described herein. The acoustic sensor device also includes an ASIC 308 mounted on a PCB 310 and encapsulated by a lid or other enclosure or cover 311. The lid 310 may be composed of, or otherwise include, a metal, plastic, ceramic, or other material. The PCB 310 and the lid 311 form a package 307 of the acoustic sensor device 305.

The lid 311 of the acoustic sensor device 305 has a height 312. The PCB 310 has a length 316, width 318, and thickness 320. A hole or sound port 314 may be formed in the lid 311 and may allow for the passage of air propagating in a direction parallel to the height 312 of the lid 311. The sound port 314 may have a circular, conical, elliptical, rectangular, hexagonal, or any other geometric profile.

FIG. 3B depicts a bottom-angled view of the acoustic sensor device 305, according to an example. A hole, or sound port, 322 is formed in the PCB 310 and allows for the passage of air. The sound port 322 may have a circular, conical, elliptical, rectangular, hexagonal, or any other geometric profile. The sound ports 314 and 322 may be opposing ports in the sense that the sound ports 314 and 322 are positioned on opposing sides of the MEMS transducer 304 of the acoustic sensor device 305. As sound travels in a direction parallel to the height 312 of the lid 311 and thickness 320 of the PCB 310, a pressure difference may be created between sound ports 314 and 322. The pressure difference may be created across the sound ports 314, 322 due to the phase and/or amplitude difference of the sound wave seen at the sound ports 314, 322. The transducer 304 is configured such that the transducer 304 vibrates in response to changes in the difference in pressure between the sound ports 314 and 322. As a sound wave travels in a direction parallel to the length 316 or width 318 of the PCB 310, the pressure seen at the sound ports 314 and 322 may be approximately equal. On the other hand, as a sound wave travels in a direction parallel to the height 312 of the lid 311 and the thickness 310 of the PCB 310 may cause higher different pressures between the sound ports 314 and 322. For example, the difference in pressure seen between the sound ports 314 and 322 may be at least 10 dB or 15 dB less when a sound wave travels in a direction parallel to the length 316 or width 318 of the PCB 310 as compared to when the sound wave travels in a direction parallel to the height 312 of the lid 310 and thickness 310 of the PCB 310.

The lid 311 may be constructed such that the volume of air it encapsulates is sufficiently small so that the Helmholtz resonance of the package is near or above the audio spectrum (e.g., greater than 20 kHz). In some examples, the length 316 and width 318 of the PCB 310 are made sufficiently small (e.g., similar to the lid 311) such that an external acoustic path length between the sound port 314 and 322 is approximately equal to the combined height 312 of the lid 310 and thickness 320 of PCB 310. In some examples, the length 316 and/or width 318 of the PCB 310 are made sufficiently large such that the external acoustic path length between the sound port 314 and 322 may be greater than the combined height 312 of the lid 310 and thickness 320 of the PCB 310. In this example, the pressure difference between the sound port 314 and 322 is increased for a sound wave travelling in a direction parallel to the height 312 of the lid 310. This results in an amplification, or boost, of the pressure difference sensed by the transducer 304 of the acoustic sensor device 305. Such a phenomenon may improve the sensitivity of the acoustic sensor device 305 to a given stimulus.

In an aspect, due the cantilever structure of the transducer 304, an acoustic impedance of the transducer 304 may generally be lower than an acoustic impedance of a similar transducer (e.g., having a similar size) transducer that is configured as a fixed-fixed transducer. The lower acoustic impedance of the transducer 304 allows the transducer 304 to sense a relatively low difference in pressure between the sound ports 314 and 322, thus improving sensitivity and signal to noise ratio of the acoustic sensor device 305 as compared to sensitivity and signal to noise ratio that may be obtainable from a similarly sized transducer having a fixed-fixed structure. However, because of the cantilever structure and the resulting low impedance of the transducer 304, the acoustic sensor device 305 is sensitive to degradation in sensitivity due to additional acoustic impedance that may be due to acoustic impedance of acoustic channels and ports that couple the transducer 304 to the acoustic environment.

In various examples, the sound ports 314 and 322 are positioned on the package 307 of the acoustic sensor device 305 in a manner that ensures that the combines acoustic impedance of the acoustic channels formed in the package 307 is less than the acoustic impedance of the transducer 304. For example, the sound ports 314 and 322 are positioned on the package 307 of the acoustic sensor device 305 such that the sound ports 314 and 322 are aligned with the transducer 304 in the package 307. In an example, the sound port 314 is embedded or otherwise formed in the lid 311 such that the sound port 314 is directly above the transducer 304 and/or aligned with a center of the transducer 304. In an example, the sound port 314 is positioned on the lid 311 such that an acoustic channel formed in the package 307 to couple the transducer 304 to the acoustic environment via the sound port 314 is straight and free of bends. In an example, the sound port 314 is positioned on the lid 311 such that the acoustic channel formed in the package 307 to couple the transducer 304 to the acoustic environment via the sound port 314 lies along a line that crosses a center of the transducer 304 at a 90 degree angle (i.e., is perpendicular) to the surface of the transducer 304. In an example, the sound port 314 is positioned on the lid 311 in a manner to form a shortest possible acoustic channel in the package 307 to couple the transducer 304 to the acoustic environment.

Similarly, in an example the sound port 322 is embedded or otherwise formed in the PCB 310 such that the sound port 322 is directly below the transducer 304 and/or aligned with a center of the transducer 304. In an example, the sound port 322 is positioned on the PCB 310 such that an acoustic channel formed in the package 307 to couple the transducer 304 to the acoustic environment via the sound port 322 is straight and free of bends. In an example, the sound port 322 is positioned on the PCB 310 such that the acoustic channel formed in the package 307 to couple the transducer 304 to the acoustic environment via the sound port 322 lies along a line that crosses a center of the transducer 304 at a 90 degree angle (i.e., is perpendicular) to the surface of the transducer 304. In an example, the sound port 322 is positioned on the PCB 310 in a manner to form a shortest possible acoustic channel in the package 307 to couple the transducer 304 to the acoustic environment. Because the sound ports 314 and 322 are aligned with the transducer 304, the acoustic resistance of the acoustic channels formed in the package 307 to couple the transducer 304 to the acoustic environment is less than the acoustic resistance of the transducer 304 and thus the package 307 does not significantly affect the relatively low acoustic impedance of the transducer 304. As a result, the package 307 does not significantly affect sensitivity of the acoustic sensor device 305. In an example, due to the aligned positioning of the sound port 314 on the lid 310, sensitivity of the acoustic sensor device 305 measured without the lid 310 is at least substantially the same as the sensitively of the acoustic sensor device 305 with the lid placed on the PCB 310.

In an aspect, the sound ports 314 and 322 are also made sufficiently large to minimize the effect of the package 307 on the relatively low acoustic impedance of the transducer 304. For example, an area of the opening of each of one or both of the first sound port 314 and the second sound port 322 is at least as large as an area of the transducer 304. In an example, because the area of the opening of each of one or both of the first port 314 and the second port 322 is at least as large as the area of the transducer 304, the relatively low acoustic impedance of the transducer 304 is not significantly affected by acoustic impedance of the sound ports 314, 322 and acoustic channels that couple the transducer 304 to the acoustic environment. In an example, due to the positioning of the sound port 314, 322, and, in at least some aspects, due to the sufficiently large area of the openings of the sound ports 314, 322, sensitivity of the acoustic sensor device 305 measured without the lid 311 placed on the PCB 310 is at least substantially the same as the sensitively of the acoustic sensor device 305 with the lid placed on the PCB 310.

Figure 4:
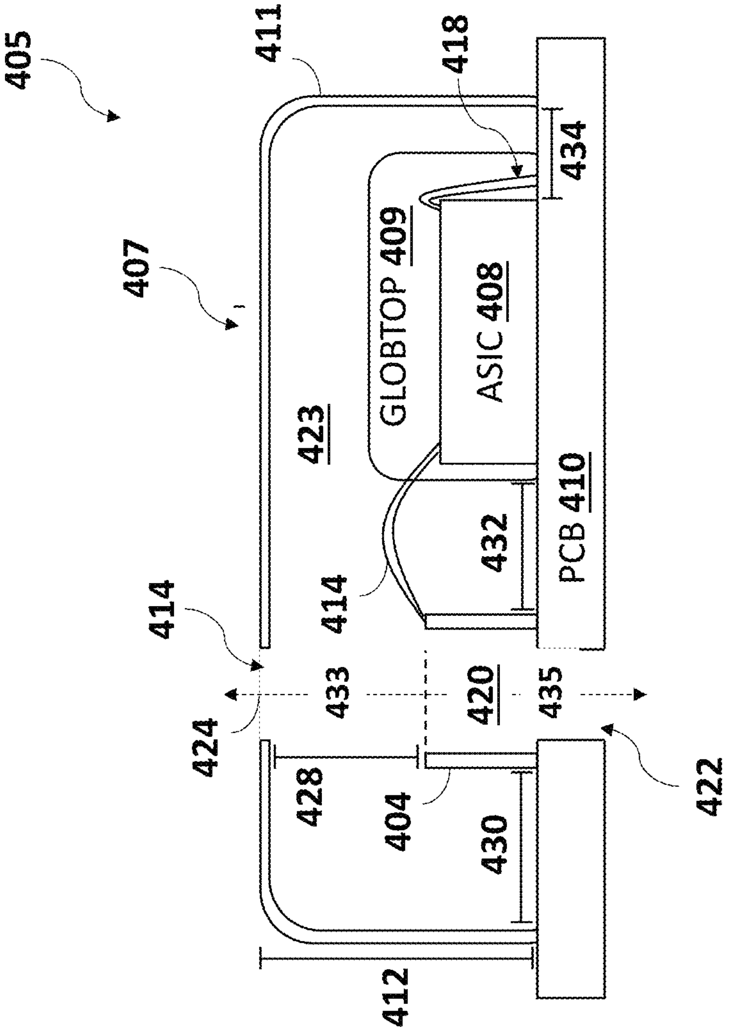
FIG. 4 is a cross-sectional, schematic view of an acoustic sensor device having opposing sound ports in accordance with an example.

FIG. 4 is a cross-sectional, schematic view of an acoustic sensor device 405 having opposing sound ports in accordance with an example. The acoustic sensor device 405 may be a microphone, for example. The acoustic sensor device 405 includes a transducer 404 attached to or otherwise supported by a PCB or other substrate 410. The transducer 404 may be a MEMS transducer. The transducer 404 may comprise a cantilever structure as described herein. The acoustic sensor device 405 may also include an ASIC 408 that may be mounted on or otherwise attached to the PCB 410. The ASIC 408 is configured to read out the electrical signal from the MEMS transducer 404. The ASIC 408 may be covered by a protective globtop 409. The PCB 410 may comprise one or more layers. In an example in which the PCB 410 has multiple layers, the layers may be separated by a dielectric material. The one or more layers of the PCB 410 may include conductive trances that may route electrical signals in the PCB 410. The ASIC 408 may be electrically connected to conductive traces on a top layer of the PCB 410 by wire bonds 418.

The transducer 404 and the ASIC 408 are encapsulated by a lid or other enclosure 411. The lid 411 may be composed of, or otherwise include, a metal, plastic, ceramic, or other material. The lid 411 and the PCB 410 may form a package 407 of the acoustic sensor device 405. The lid 411 may have a height 412. The transducer 404 and ASIC 408 may be electrically connected by wire bonds 414, either directly to each other, or via traces on the PCB 410. In other examples, the transducer 404, the ASIC 408, and/or the lid 411 may be attached using other methods known to those skilled in the art. For example, the transducer 404 may be attached to the PCB 410 using flip chip technology.

A first sound port 414 is embedded or otherwise formed in the lid 411 of the acoustic sensor device 405 and a second sound port 422 is embedded or otherwise formed in the PCB 410. The sound ports 414 and 422 couple the transducer 404 to an ambient environment via respective acoustic channels 433 and 435 that may be formed in the package 407 on opposing sides of the transducer 404. The sound ports 414 and 422 are configured to allow ambient sound to couple into the enclosed front air volume 420 and back air volume 423 defined by the lid 411, the PCB 410, and the MEMS transducer 404.

As sound travels along a direction 424, parallel to the axis connecting the opposing sound ports 414 and 422, a pressure difference is created across the sound ports 414 and 422 due to the phase difference of the sound wave. In some instances, the pressure difference created may also be due to an amplitude difference in the sound wave at the sound ports 414 and 422. In such an instance, the sound wave may be a spherical wave. A pressure difference between the sound ports 414 and 422 drives air into and out of the acoustic sensor device 405. The transducer 404 may be located within the device package above the sound port 422 such that pressure difference between the air volumes 420 and 423 causes the transducer 404 to oscillate. The oscillation is transduced into a voltage signal. One method of transduction is capacitive sensing. Other methods of transduction may be used, including, for instance, electromagnetic, piezoelectric, optical or strain sensing.

In an example, the transducer 404 creates an effective seal (e.g., across audible frequencies of sound) within the enclosed package separating the air volume into the air volumes 420, 423. In another example, the transducer 404 allows air to flow freely between the air volumes 420 and 423, which may include air motion excited by sound waves in the frequency range of 20 Hz-20 kHz. In this example, oscillation of the transducer 404 may be driven by air flow through the transducer 404. In some examples, the air may not physically flow through the transducer 404, but the transducer 404 may be sufficiently compliant to allow the motion of the air to transmit between the front volume and back volume of air as if the transducer was nearly or effectively acoustically transparent.

When sound travels in a direction perpendicular to the direction 424, the pressure is approximately the same at the sound ports 414 and 422 and no air is driven into the acoustic sensor device 405. Thus, the acoustic sensor device 405 at least primarily responds to sound travelling along direction 424, parallel to the axis on which the sound ports 414 and 422 are disposed. However, at certain frequencies, the package of the acoustic sensor device 405 may resonate (e.g., due to a Helmholtz resonance), and the air can enter the acoustic sensor device 405 regardless of the direction of the sound wave, causing an undesired voltage signal and compromising the directionality of the acoustic sensor device 405.

Thus, in an aspect, the acoustic sensor device 405 may be constructed or otherwise configured such that the air volume 423 is minimized, and the resulting resonances occur at frequencies higher than the audio band (e.g., close to or above 20 kHz). The height 412 of the lid 411 may be minimized such that the distance 428 between the transducer 404 and the lid 411 is minimized. In some examples, the height 412 of the lid 411 may be less than 2 um or less than 1 um and the distance 428 between the transducer 404 and the lid 411 may be between 50 um-500 um. Alternatively or additionally, a distance 430 between the lid 411 and the transducer 404 a distance 432 between the transducer 404 and the ASIC 408, and/or a distance 434 between the ASIC 408 and the lid 411 may be minimized such that the air volume 423 is minimized. For example, each of the distances 430, 432, and/or 434 may be between 50 um-500 um. Additionally or alternatively, the globtop 409 may be dispensed such that it consumes a significant portion of the air volume 423.

In various examples, the sound ports 414 and 422 are positioned on the package 407 of the acoustic sensor device 405 in a manner that ensures that the combines acoustic impedance of the acoustic channels formed in the package 407 is less than the acoustic impedance of the transducer 404. For example, the sound ports 414 and 422 are positioned on the package 407 of the acoustic sensor device 405 such that the sound ports 414 and 422 are aligned with the transducer 404 in the package 407. In an example, the sound port 414 is embedded or otherwise formed in the lid 411 such that the sound port 414 is directly above the transducer 404 and/or aligned with a center of the transducer 404. In an example, the sound port 414 is positioned on the lid 411 such that the acoustic channel 433 formed in the package 407 is straight and free of bends. In an example, the sound port 414 is positioned on the lid 411 such that the acoustic channel 433 formed in the package 407 lies along a line that crosses a center of the transducer 404 at a 90 degree angle (i.e., is perpendicular) to the surface of the transducer 404. In an example, the sound port 314 is positioned on the lid 411 in a manner such that the acoustic channel 433 is a shortest possible acoustic channel that can be formed in the package 307 to couple the transducer 304 to the acoustic environment via the sound port 414.

Similarly, in an example the sound port 422 is embedded or otherwise formed in the PCB 410 such that the sound port 422 is directly below the transducer 404 and/or aligned with a center of the transducer 404. In an example, the sound port 422 is positioned on the PCB 410 such that the acoustic channel 435 formed in the package 407 is straight and free of bends. In an example, the sound port 422 is positioned on the PCB 410 such that the acoustic channel 435 formed in the package 407 lies along a line that crosses a center of the transducer 404 at a 90 degree angle (i.e., is perpendicular) to the surface of the transducer 404. In an example, the sound port 422 is positioned on the PCB 410 in a manner such that the acoustic channel 435 is a shortest possible acoustic channel that can be formed in the package 407 to couple the transducer 304 to the acoustic environment via the sound port 422. Because the sound ports 414 and 422 are aligned with the transducer 404, the acoustic resistance of the acoustic 433, 435 channels formed in the package 407 to couple the transducer 404 to the acoustic environment is less than the acoustic resistance of the transducer 404 and thus the package 407 does not significantly affect the relatively low acoustic impedance of the transducer 404. As a result, the package 407 does not significantly affect sensitivity of the acoustic sensor device 405.

In an aspect, the sound ports 414 and 422 are also made sufficiently large to minimize the effect of the package 407 on the relatively low acoustic impedance of the transducer 404. For example, an area of the opening of each of one or both of the first sound port 414 and the second sound port 422 is at least as large as an area of the transducer 404. In an example, because the area of the opening of each of one or both of the first port 414 and the second port 422 is at least as large as the area of the transducer 404, the relatively low acoustic impedance of the transducer 404 is not significantly affected by acoustic impedance of the sound ports 414, 422 and acoustic channels that couple the transducer 404 to the acoustic environment. In an example, due to the aligned positioning of the sound ports 414, 422 and, in at least some aspects, due to the sufficiently large area of the openings of the sound ports 414, 422, sensitivity of the acoustic sensor device 405 measured without the lid 411 placed on the PCB 410 is at least substantially the same as the sensitively of the acoustic sensor device 405 with the lid placed on the PCB 410.

Figure 5:
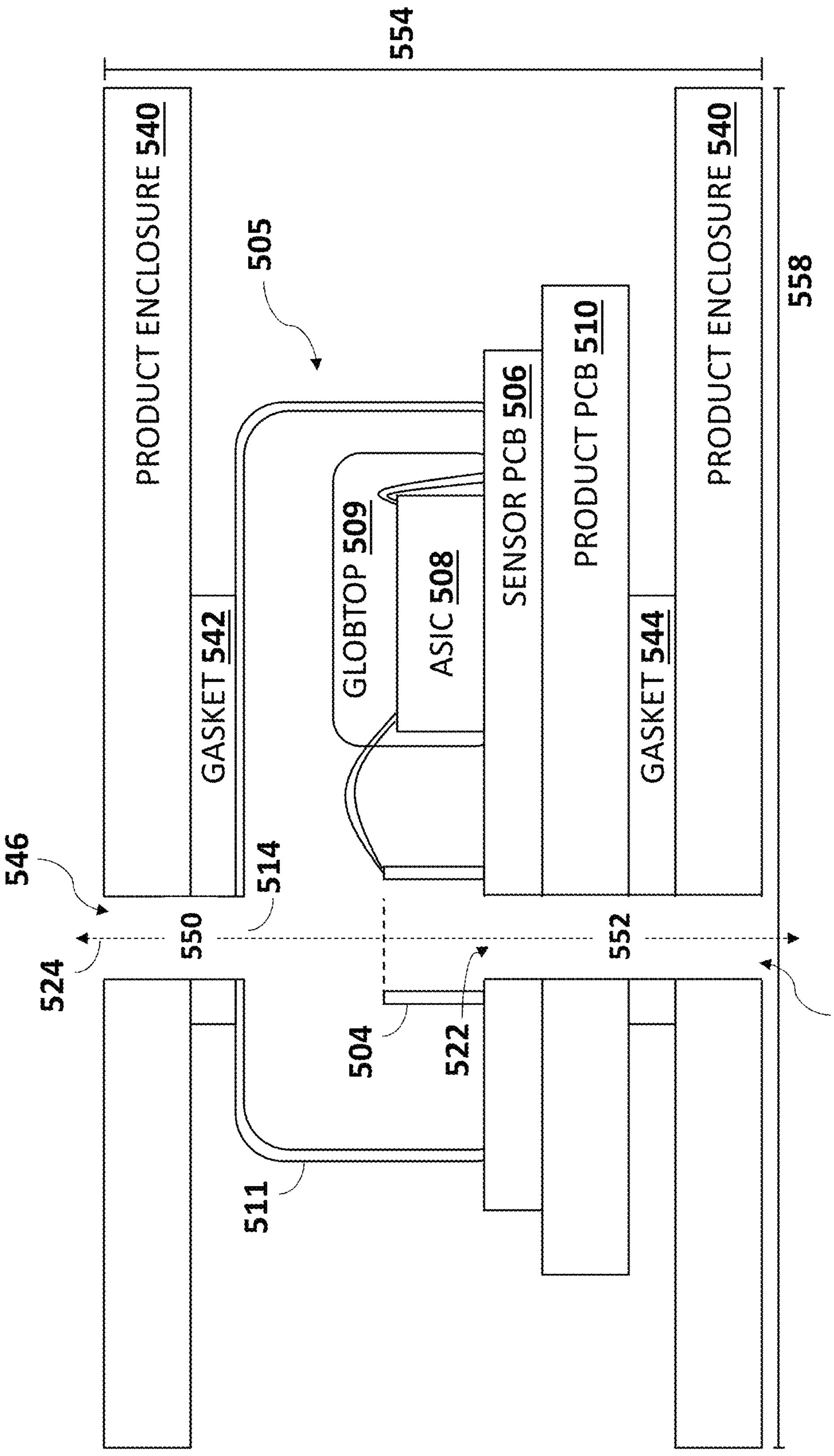
FIG. 5 is a cross-sectional, schematic view of an acoustic sensor device having opposing sound ports and disposed in a housing of a product in accordance with an example.

FIG. 5 is a cross-sectional, schematic view of an acoustic sensor device 505 having opposing sound ports and disposed in a housing of a product or enclosure 540 in accordance with an example. The acoustic sensor device 505 includes a transducer 504 and an ASIC 508 protected by a globtop 509 and encapsulated between a lid 511 and a PCB 510. The acoustic sensor device 505 has a first sound port 514 embedded or otherwise formed in the lid 511 and a second sound port 522 embedded of otherwise formed in the PCB 510. The PCB 510 is further mounted or otherwise supported by a printed circuit board 526 of the product within which the acoustic sensor device 505 is embedded. The acoustic sensor device 505 and the product PCB 526 are then coupled to the product enclosure 540 through gaskets 542 and 544. The product enclosure 540 includes a first sound port 546 and a second sound port 548. A first acoustic channel 550 is defined by the product enclosure 540 and gasket 542 so that acoustic channel 550 couples the first sound port in the product enclosure 540 to the first sound port 514 of the acoustic sensor device 505. A second acoustic channel 552 is defined by the product enclosure 540, the gasket 544, and the product PCB 526 such that the acoustic channel 552 couples the second sound port 548 in the product enclosure 540 to the second sound port 522 of the acoustic sensor device 522. As sound travels along a direction 524, the sound can flow through the acoustic channels 550 and 552 and excite the transducer 504. When sound travels in a direction perpendicular to the direction 524, the pressure is approximately the same at the sound ports 546 and 548 and no air is driven into the acoustic channels 550 and 552. Thus, the acoustic sensor device 505 may thus only be exposed to sound waves travelling along direction 524.

One or more aspects of MEMS sensor 505 may be configured to increase the amount of airflow through the acoustic channels 550 and 552 for sound travelling in direction 524. The product has a total acoustic channel length 554 between the opposing surfaces of its enclosure 540. The total acoustic channel length 554 may be defined by the combined length of the sound port 546, acoustic channel 550, sound port 514, acoustic channels formed in the acoustic sensor device 505, sound port 522, acoustic channel 552, and sound port 548. The product enclosure 540 may also have a length 558 and a width that extends in the direction into the page of the drawing. In some examples, the length 558 and/or width of the product enclosure 540 may be greater than the total acoustic channel length 554. In such cases, for the same acoustic stimulus, the air flow through the acoustic channels 550 and 552 may be greater than a case in which the length 558 and width of the product enclosure 540 are less than the total acoustic channel length 554.

Figure 6:
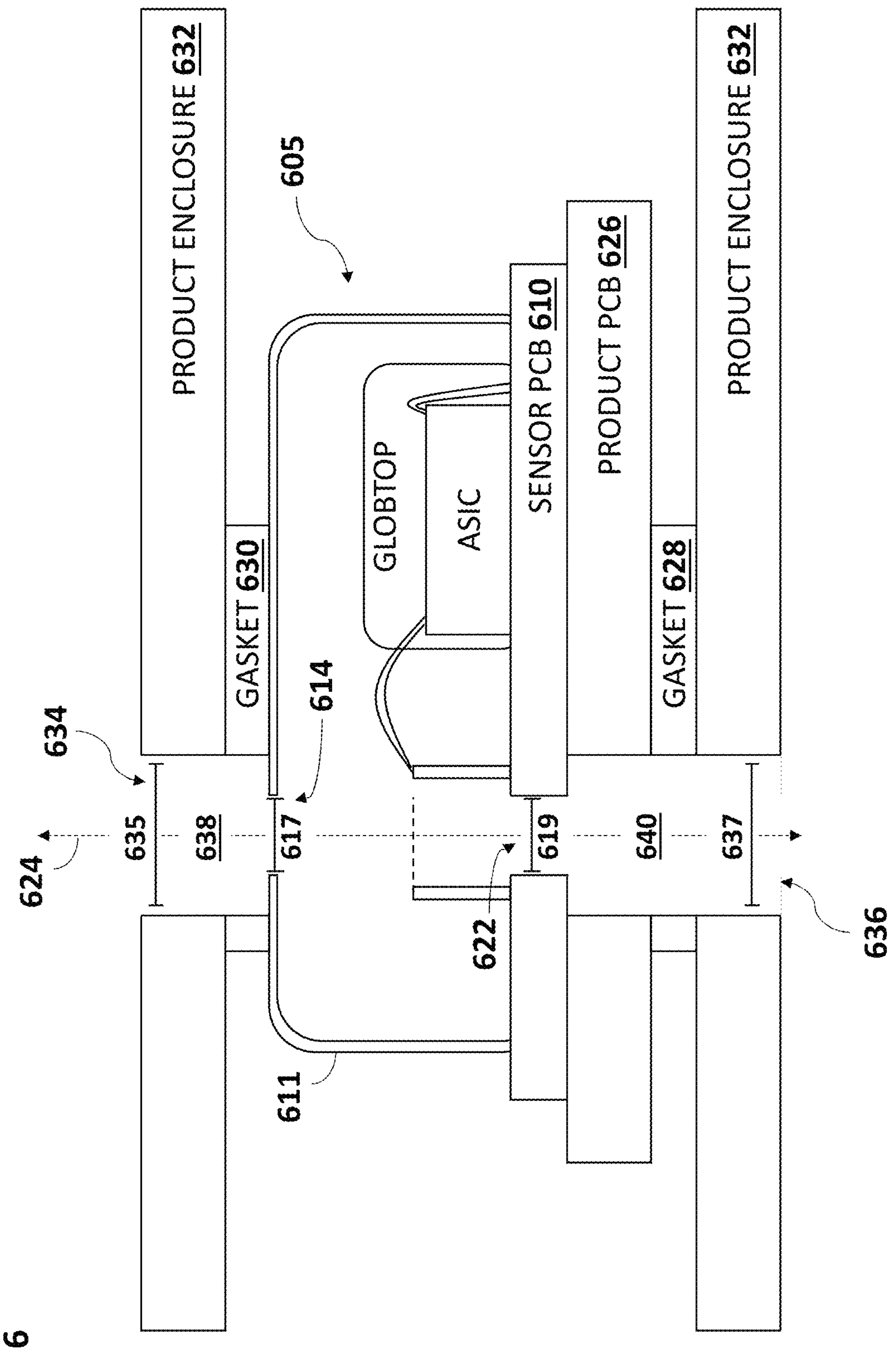
FIG. 6 is a cross-sectional, schematic view of an acoustic sensor device having opposing sound ports and disposed in a housing of a product in accordance with another example.

FIG. 6 is a cross-sectional, schematic view of an acoustic sensor device 605 having opposing sound ports and disposed in a housing or enclosure 632 of a product in accordance with another example. In the example of FIG. 6, the housing or enclosure 640 and the acoustic sensor device 605 are configured such that air flow into the acoustic sensor device 605 is boosted. PCB 610 is mounted on or otherwise supported by a printed circuit board 626 of the product within which the acoustic sensor device 605 is embedded. The acoustic sensor device 605 and product PCB 626 are then coupled to the product enclosure 632 through gaskets 628 and 630. The product enclosure 632 includes a first sound port 634 that couples the ambient air to a first sound port 614 in the sensor acoustic device 605 through an acoustic channel 638. The product enclosure 632 includes a second sound port 636 that couples the ambient air to a second sound port 622 in the in the sensor acoustic device 605 through an acoustic channel 640. The sound ports of the product enclosure 634 and 636 have diameters 635 and 637 respectively. The sound ports of the sensor 614 and 622 have diameters 617 and 619 respectively. In some examples, the diameters 635 and 637 of the sound ports 634 and 636 are greater than the diameters 617 and 619 of the sound ports 614 and 622. In this example, as air passes through the acoustic channels 638 and 640 into the acoustic sensor device 605, its velocity is increased. The increase in air velocity may be proportional to the ratio of the diameters 635 and 637 relative to the diameters 617 and 619. In some examples, the acoustic channels 638 and 640 may have a conical profile, e.g., a funnel shape, to create a smooth transition between the larger sound ports of the product enclosure 634 and 636 to the smaller sound ports 614 and 622 of the acoustic sensor device 605.

Figure 7:
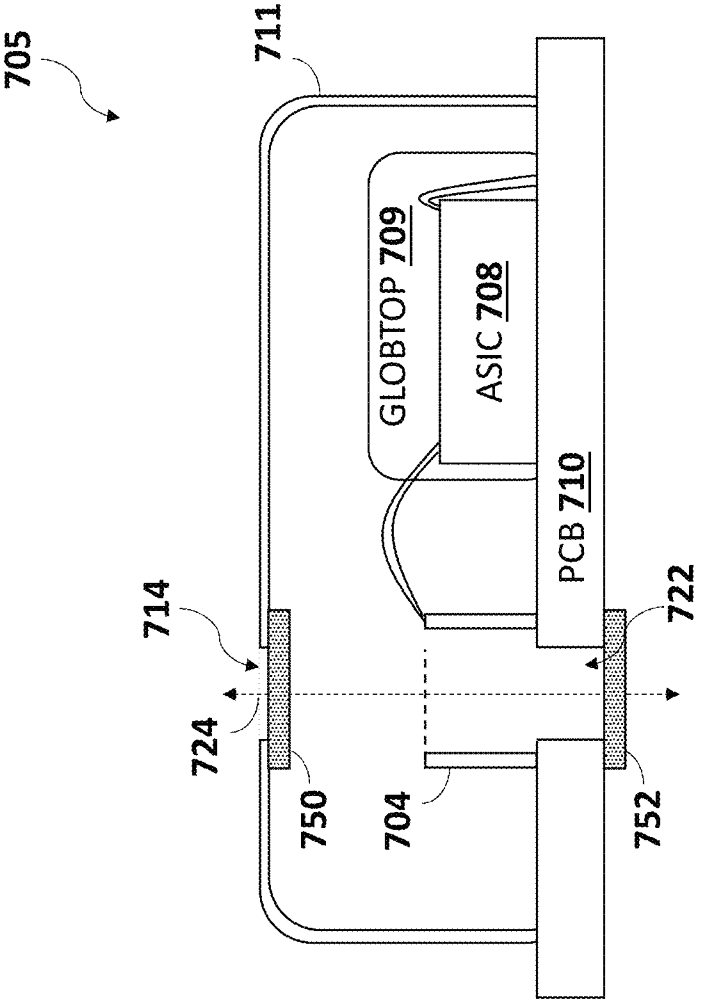
FIG. 7 is a cross-sectional, schematic view of an acoustic sensor device having opposing sound ports and particulate and/or liquid ingress protection in accordance with one example.

In some examples, a mesh may be integrated with an acoustic sensor device to protect it from particulate or liquid ingress. FIG. 7 depicts an acoustic sensor device 705 having opposing sound ports and particulate and/or liquid ingress protection in accordance with one example. The acoustic sensor device 705 includes a transducer 704 and an ASIC 708 protected by a globtop 709 and encapsulated between a lid 711 and a PCB 710. The acoustic sensor device 705 has a first sound port 714 embedded or otherwise formed in the lid 711 and a second sound port 722 embedded or otherwise formed in the PCB 710. As sound travels along a direction 724, a pressure difference seen at the ports 714, 722 can excite the MEMS transducer 704. Underneath the sound port 714 is a first protective mesh 750. Underneath the sound port 722 and beneath the PCB 710 is a second protective mesh 752. The first and second acoustic meshes 750 and 752 are constructed such that they do not significantly impede air flow along direction 724 but block certain particulates and liquids from entering the acoustic sensor device 705. In other cases, the acoustic sensor device 705 may include a single mesh. In other examples, the first mesh 750 and/or the second mesh 752 may have an acoustic impedance such that it changes the directionality pattern, or characteristics, of the acoustic sensor device 705. For example, one of the meshes 750 or 752 may serve as an acoustic time delay element.

Figure 8:
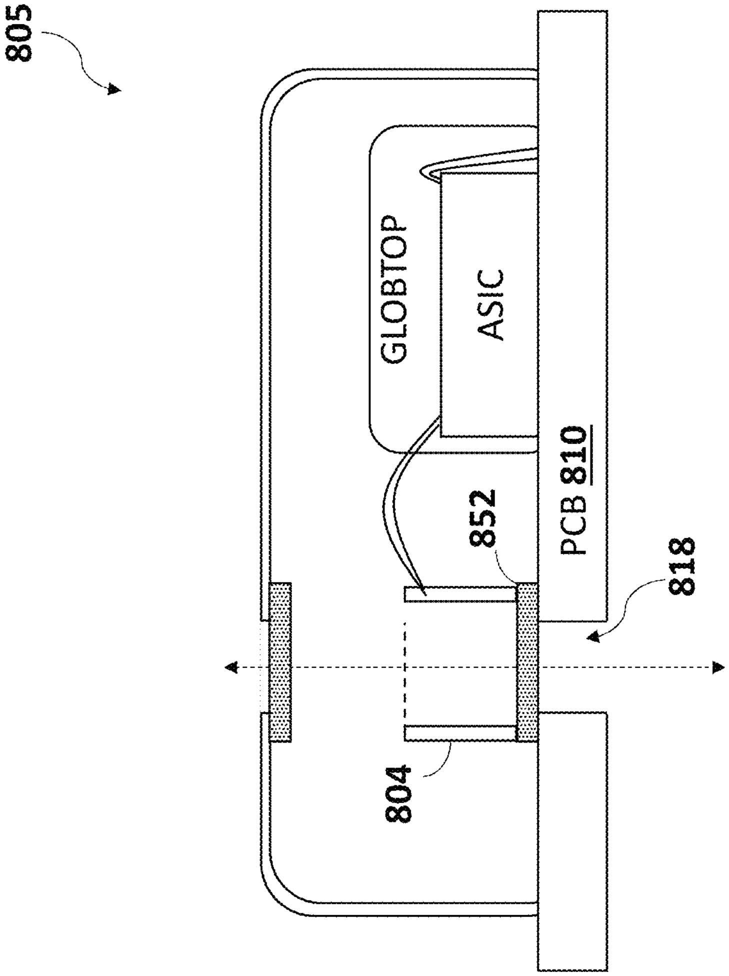
FIG. 8 is a cross-sectional, schematic view of an acoustic sensor device having opposing sound ports and particulate and/or liquid ingress protection in accordance with another example.

FIG. 8 depicts an acoustic sensor device 805 having opposing sound ports and particulate and/or liquid ingress protection in accordance with another example. The acoustic sensor device 805 may be configured the same as the acoustic sensor device 705 (FIG. 7) except a second protective mesh 852 is placed above the sound port 822 and PCB 810, and beneath the transducer 804.

In other cases, the acoustic meshes may be integrated outside of the acoustic sensor device, but within the acoustic channel coupled to the sound ports of the acoustic sensor device.

In some examples of acoustic sensing devices, it may be useful to use at least two acoustic sensors to capture sound from multiple directions. In FIG. 9, two acoustic sensor devices **905*a* and 905*b* are configured to capture sound from two different directions. Acoustic sensor devices 905*a* and 905*b* may be configured to operate in a manner same as or similar to the acoustic sensor devices described herein. The acoustic sensor devices 905*a* and 905*b* are constructed or disposed on printed circuit boards 910*a* and 910*b*, respectively, and are oriented at an angle 970 from one another. In this configuration, acoustic sensor device 905*a* responds only to sound propagating along a first direction, perpendicular to the printed circuit board 910*a*, and acoustic sensor device 905*b* responds only to sound propagating along a second direction, perpendicular to printed circuit board 910*b*. The first and second direction have an angle 970 between them. The angle 970 is nonzero such that the first and second direction are different. In some examples, the angle 970 may be 90 degrees. In this case, acoustic sensor devices 905*a* and 905*b* are said to be orthogonal to one another such that the first direction is perpendicular to the second direction. Such a configuration may be useful when the outputs of acoustic sensor devices 905*a* and 905*b* are connected to a computing device for further processing. For example, the signals from acoustic sensor devices 905*a* and 905*b*** may be processed to perform sound localization, sound source separation, beamforming, dereverberation, noise cancellation, and other acoustic signal processing algorithms.

FIG. 10 is an extension of FIG. 9 in which three directional microphones are all oriented perpendicularly to only another to provide full 360-degree sensing. In this example, all three microphones point in three different perpendicular directions to one another.

Described above are a number of examples of acoustic sensor devices equipped with transducers (e.g., MEMS transducers) comprising a cantilever, i.e., a fixed-free, structure. An example acoustic sensor device also includes at least two sound ports positioned on the package on opposing sides of the transducer. The at least two sound ports couple the transducer to an ambient environment via respective acoustic channels formed in the package of the acoustic sensor device. As described above, in each of the examples, the cantilever structure of the transducer results in a relatively low acoustic impedance of the transducer and improves the sensitively of the acoustic sensor device as compared to acoustic sensor devices equipped with similarly sized fixed-fixed transducers. In the examples described above, the at least two sound ports are positioned on the package in a manner that ensures that a combined acoustic impedance of the acoustic channels formed in the package is less the acoustic impedance of the transducer. For example, the at least two sound ports are positioned on the package of the acoustic sensor device such that the at least two sound ports are aligned with the transducer in the acoustic sensor device. In at least some examples, the at least two sound ports are also made sufficiently large to minimize the effect of the package on the acoustic impedance of the transducer. For example, the area of the opening of one or more of the at least two sound ports is at least as large as the area of the transducer. As described above, in various examples, as a result of the particular positioning of the sound ports on the package and, in at least some examples, of the sufficiently large size of the sound ports positioned on the package, the package of the acoustic sensor device does not significantly affect the relatively low acoustic impedance of the cantilever transducer and, thus, does not significantly affect the relatively low sensitivity of the acoustic sensor device.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. An acoustic sensor device, comprising:

a package;

a substrate disposed in the package;

a microelectromechanical system (MEMS) transducer formed in the substrate, the MEMS transducer i) comprising a cantilever structure and ii) having a first acoustic impedance; and at least two sound ports positioned on the package on opposing sides of the MEMS transducer, the at least two sound ports coupling the MEMS transducer to an ambient environment via respective acoustic channels formed in the package, wherein the at least two sound ports are positioned on the package in a manner that ensures that the respective acoustic channels have a combined second acoustic impedance that is less than the first acoustic impedance of the MEMS transducer.

2. The acoustic sensor device of claim 1, wherein:

the at least two sound ports include a first sound port positioned above the MEMS transducer, the first sound port coupling the MEMS transducer to the ambient environment via a first acoustic channel formed in the package, and a second sound port positioned below the MEMS transducer, the second sound port coupling the MEMS transducer to the ambient environment via a second acoustic channel formed in the package, and the first sound port and the second sound port are positioned on the package such that the first sound port and the second sound port are aligned with the MEMS transducer to ensure that the first acoustic channel and the second acoustic channel have the combined second acoustic impedance that is less than the first acoustic impedance of the MEMS transducer.

3. The acoustic sensor device of claim 2, wherein at least one of the first sound port and the second sound port is positioned on the package such that at least of the first acoustic channel and the second acoustic channel is straight.

4. The acoustic sensor device of claim 2, wherein each of one or both of the first sound port and the second sound port comprises an opening having an area that is at least as large as an area of the MEMS transducer.

5. The acoustic sensor device of claim 2, wherein:

the package includes i) a printed circuit board (PCB) that comprises the substrate and i) a lid over the substrate;

the first sound port comprises a first hole in the lid on a first side the MEMS transducer; and the second sound port comprises a second hole in the PCB on a second side of the MEMS transducer opposite of the first side of the MEMS transducer.

6. The acoustic sensor device of claim 5, wherein the PCB has a width, a length, and a thickness, the lid has a height, and the width and the length of the PCB are designed such that an outside acoustic path between the first sound port and the second sound port is at least substantially equal to a combination of the thickness of the PCB and the height of the lid.

7. The acoustic sensor device of claim 5, wherein the PCB has a width, a length, and a thickness, the lid has a height, and the width and the length of the PCB are designed such that an outside acoustic path between the first sound port and the second sound port is greater than a combination of the thickness of the PCB and the height of the lid.

8. The acoustic sensor device of claim 5, wherein a height of the lid is designed to substantially minimize a volume formed between the lid and the PCB such that a resonant frequency of the package is above an audible frequency range.

9. The acoustic sensor device of claim 1, wherein the MEMS transducer comprises one or more porous plates.

10. The acoustic sensor device of claim 1, wherein the MEMS transducer comprises an array of beams having air gaps between respective beams of the array of beams.

11. The acoustic sensor device of claim 1, wherein the substrate includes a cavity, and the MEMS transducer is suspended over the cavity.

12. The acoustic sensor device of claim 11, wherein the MEMS transducer and/or the cavity are configured to block frequencies of sound below and/or above an audible sound range.

13. An acoustic sensor device, comprising:

a package including at least a substrate and a lid over the substrate;

a microelectromechanical system (MEMS) transducer formed in the substrate, the MEMS transducer comprising a cantilever structure;

a first sound port on the lid above the MEMS transducer, the first sound port coupling the MEMS transducer to an ambient environment via a first acoustic channel formed in the package; and a second sound port on the substrate below the MEMS transducer, the second sound port coupling the MEMS transducer to the ambient environment via a second acoustic channel formed in the package, wherein positions of the first sound port on the lid and the second sound port on the substrate are such that the first sound port and the second sound port are aligned with the MEMS transducer in a manner that ensures that the first acoustic channel and the second acoustic channel have a combined second acoustic impedance that is less than a first acoustic impedance of the MEMS transducer.

14. The acoustic sensor device of claim 13, the first sound port is positioned on the lid such that the first acoustic channel is straight.

15. The acoustic sensor device of claim 13, each of one or both of the first sound port and the second sound port comprises an opening having an area that is at least as large as an area of the transducer.

16. The acoustic sensor device of claim 13, wherein the MEMS transducer comprises one or more porous plates.

17. The acoustic sensor device of claim 13, wherein the MEMS transducer comprises an array of beams having air gaps between respective beams of the array of beams.

18. The acoustic sensor device of claim 13, wherein a height of the lid is designed to substantially minimize a volume formed between the lid and the substrate such that a resonant frequency of the package is above an audible frequency range.

19. The acoustic sensor device of claim 13, wherein the substrate includes a cavity, and the MEMS transducer is suspended over the cavity.

20. The acoustic sensor device of claim 19, wherein the MEMS transducer and/or the cavity are configured to block frequencies of sound below and/or above an audible sound range.

* * * * *